United States Patent
Turpen et al.

(10) Patent No.: US 11,084,236 B2
(45) Date of Patent: Aug. 10, 2021

(54) METHOD FOR PREPARING AN OPTICAL ELEMENT WHICH COLORS IN A NON-UNIFORM LINEAR PATTERN

(71) Applicant: Transitions Optical, Inc., Pinellas Park, FL (US)

(72) Inventors: Joseph D. Turpen, Safety Harbor, FL (US); Jennine M. Frease, St. Petersburg, FL (US); William D. Carpenter, Pinellas Park, FL (US); Kevin J. Stewart, Palm Harbor, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/556,633

(22) PCT Filed: Mar. 10, 2015

(86) PCT No.: PCT/US2015/019700
§ 371 (c)(1),
(2) Date: Sep. 8, 2017

(87) PCT Pub. No.: WO2016/144333
PCT Pub. Date: Sep. 15, 2016

(65) Prior Publication Data
US 2018/0056615 A1    Mar. 1, 2018

(51) Int. Cl.
*B29D 11/00* (2006.01)
*G02B 5/23* (2006.01)
*G02B 5/20* (2006.01)
*G02C 7/10* (2006.01)

(52) U.S. Cl.
CPC .. *B29D 11/00653* (2013.01); *B29D 11/00923* (2013.01); *G02B 5/208* (2013.01); *G02B 5/23* (2013.01); *G02C 7/102* (2013.01)

(58) Field of Classification Search
CPC ........ B29D 11/00653; B29D 11/00923; B29D 11/0653; B41M 3/003; B41M 5/0047; G02B 5/208; G02C 7/102
USPC ........................................................ 427/162
See application file for complete search history.

(56) References Cited

U.S. PATENT DOCUMENTS

| | | | |
|---|---|---|---|
| 4,289,497 A * | 9/1981 | Hovey | D06P 3/00 252/586 |
| 4,731,264 A | 3/1988 | Lin et al. | |
| 4,756,973 A | 7/1988 | Sakagami et al. | |
| 5,134,191 A | 7/1992 | Takarada et al. | |
| 5,231,156 A | 7/1993 | Lin | |
| 5,462,806 A | 10/1995 | Konishi et al. | |
| 5,806,834 A | 9/1998 | Yoshida | |
| 7,189,456 B2 | 3/2007 | King | |
| 7,452,611 B2 | 11/2008 | Blackburn et al. | |
| 8,684,524 B2 | 4/2014 | Archambeau et al. | |
| 8,814,352 B2 | 8/2014 | Archambeau et al. | |
| 2002/0182316 A1* | 12/2002 | Gilliard | B29D 11/00317 351/159.62 |
| 2004/0096666 A1* | 5/2004 | Knox | C08G 18/6674 428/412 |
| 2006/0177597 A1* | 8/2006 | Ebisawa | B41M 5/0017 427/558 |
| 2008/0167183 A1* | 7/2008 | Hoekstra | B41M 5/385 503/201 |
| 2008/0187760 A1* | 8/2008 | Wiand | B29D 11/00317 428/412 |
| 2012/0120473 A1* | 5/2012 | Kumar | C09B 57/00 359/241 |
| 2012/0145973 A1* | 6/2012 | Bancroft | C07D 311/78 252/586 |

FOREIGN PATENT DOCUMENTS

| | | |
|---|---|---|
| GB | 1520099 | 8/1978 |
| WO | 9420581 A1 | 9/1994 |

* cited by examiner

*Primary Examiner* — Elizabeth A Burkhart
(74) *Attorney, Agent, or Firm* — The Webb Law Firm

(57) ABSTRACT

A method for preparing an optical element which colors in a non-uniform linear pattern is provided. The method includes (I) providing an optical element which previously has been treated with a photochromic composition containing at least one first photochromic material, the photochromic composition having an absorbance spectrum in the region of photochromic activation; (II) preparing at least one light-absorbing composition containing ultraviolet light absorber, a second photochromic material which is the same or different than the first photochromic material, or mixtures thereof, where the light-absorbing composition has an absorbance spectrum overlapping with that of the photochromic composition in the region of photochromic activation; (III) depositing the light-absorbing composition over the surface of the photochromic optical element in a controlled, predetermined pattern using an inkjet printing apparatus to provide a linearly gradient color pattern upon exposure to actinic radiation; (IV) and drying the composition. An optical element also is provided.

20 Claims, No Drawings

METHOD FOR PREPARING AN OPTICAL ELEMENT WHICH COLORS IN A NON-UNIFORM LINEAR PATTERN

CROSS-REFERENCE TO RELATED APPLICATION

This application is the United States national phase of International Application No. PCT/US2015/019700 filed Mar. 10, 2015, which is incorporated herein by reference in its entirety.

FIELD OF THE INVENTION

The present invention is directed to a method for preparing an optical element which colors in a non-uniform linear pattern, such as a linearly gradient color pattern, using an inkjet printing apparatus.

BACKGROUND OF THE INVENTION

Gradient tinting methods are known for use in coloring optical elements, such as lenses. The gradient tinting effect provides a functional advantage in that the lens generally has a higher color density at the top of the lens for improved distance viewing with less color density at the bottom of the lens, and an aesthetic effect for fashion and style.

Further, there are well known methods for applying a photochromic composition to optical elements. For example, photochromic materials may be incorporated into the substrate components used to form the optical element. Alternatively, the photochromic materials may be applied to the surface of the optical element and permitted to penetrate into the surface region (known as imbibition). Additionally, the photochromic material can be applied to the optical element as a coating by known methods, such as spin coating, dip coating, spray coating, and the like.

Methods have been disclosed to achieve a gradient photochromic optical element. Generally, gradient tinting of eyewear lenses is accomplished by dipping or submerging the lens into a dye bath. This process requires more precise and reproducible processing than is required for solid tinting or coloring. Moreover, some optical substrates, such as polycarbonate lens material, absorb dyes very poorly. While methods have been developed to overcome these processing difficulties, such methods often require additional manufacturing steps, thus adding additional manufacturing costs.

It is known in the art to prepare light-transmissible articles from a polymeric material where the article includes a photochromic dye and a compatible light-absorbing material (i.e., the light-absorbing material exhibits substantial overlap in its absorbance spectrum, with the spectrum of the photochromic dye in the region of photochromic activation) distributed on or within the article. The combination of photochromic dye and compatible light-absorbing materials is such that the depth of darkening (coloring) of the photochromic dye upon exposure to actinic radiation is rendered substantially uniform regardless of variations in length, thickness, or local changes of surface shape.

Accordingly, it would be desirable to provide a cost-effective method of preparing a gradient photochromic optical element where a light-absorbing composition can be applied to a photochromic article in a controlled and pre-determined gradient pattern to the surface of the optical element in order to create a gradient color pattern upon exposure of the optical element to actinic radiation.

SUMMARY OF THE INVENTION

The present invention provides a method for preparing an optical element which colors in a non-uniform linear pattern upon exposure to actinic radiation, the method comprising (i) providing an optical element which previously has been treated on at least one surface with a photochromic composition comprising at least one first photochromic material, the photochromic composition having an absorbance spectrum in the wavelength region of photochromic activation; (ii) preparing at least one light-absorbing composition comprising at least one ultraviolet (UV) light absorber, at least one second photochromic material which is the same or different than the first photochromic material, or mixtures thereof, the light-absorbing composition having an absorbance spectrum which substantially overlaps with the absorbance spectrum of the photochromic composition in the region of photochromic activation; (iii) depositing at least one light-absorbing composition over the surface of the optical element that has been treated with the photochromic composition in a controlled, predetermined pattern using an inkjet printing apparatus so as to provide a linearly gradient color pattern on the optical element upon exposure to actinic radiation; and (iv) drying the light-absorbing composition. An optical element prepared by the method of the present invention is also provided.

DETAILED DESCRIPTION OF THE INVENTION

Unless otherwise indicated, all ranges or ratios disclosed herein are to be understood to encompass any and all sub-ranges or sub-ratios subsumed therein. For example, a stated range or ratio of "1 to 10" should be considered to include any and all sub-ranges between (and inclusive of) the minimum value of 1 and the maximum value of 10. That is, all sub-ranges or sub-ratios beginning with a minimum value of 1 or more and ending with a maximum value of 10 or less, such as, but not limited to, 1 to 6.1; 3.5 to 7.8; and 5.5 to 10.

As used herein and in the claims, the term "polymer" and like terms means homopolymers (prepared from a single monomer), copolymers (prepared from two or more different monomers), and graft polymers, including but not limited to comb graft polymers, star graft polymers, and dendritic graft polymers.

As used in this specification and the appended claims, the articles "a", "an", and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about". Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

As previously mentioned, the present invention is directed to a method for preparing an optical element which, upon exposure to actinic radiation, colors in a non-uniform linear pattern, that is, a linearly gradient color pattern. For purposes of the present invention, a "linearly gradient color pattern" is achieved through the deposition of a light-absorbing composition (via inkjet printing techniques as described below) onto at least one surface of an optical element which previously has been treated on at least one surface with a photochromic composition comprising at least one first photochromic material. The photochromic composition has an absorbance spectrum in the wavelength region of photochromic activation. The light-absorbing composition has an absorbance spectrum which substantially overlaps with the absorbance spectrum of the photochromic composition in the region of photochromic activation. The deposition of the light-absorbing composition is carried out in such a way so as to create a gradual, visually discernible variation in hue and/or color density over an area of the optical element when the optical element is exposed to actinic radiation.

The gradual variation in hue and/or color density occurs across the surface of the optical element in one direction. For example, when the optical element is a lens, the variation in hue and/or color density can occur from the bottom of the lens to the top of the lens, or vice versa. That is, the deposition of each particular light-absorbing composition occurs across the lens from one side to the other and varies in composition or coating thickness such that the variation in hue and/or color density occurs from the bottom to the top, or vice versa.

The term "hue" as used herein means pure color in terms, such as "green", "red", or "magenta", and includes mixtures of two pure colors like "red-yellow" (i.e., "orange"), or "yellow-green". The term "color density" as used herein means, upon exposure to actinic radiation, optical density of an area of the optical element surface printed with the colorant composition. A higher color density results in a lower percent light transmittance. For purposes of this invention, the bottom of the lens is closest to the lens wearer's cheekbone, and the top of the lens is closest to the lens wearer's forehead. This linearly gradient color pattern should be differentiated from radially gradient color patterns known in the art, e.g., those used in connection with lenses, wherein color density varies radially outward from a center point to the outer perimeter of the lens.

The optical element can be any of those known in the art. Generally, the optical element is selected from the group consisting of lenses, windows, display elements, goggles, visors, face shields, automotive transparencies, e.g., sunroofs and light covers, aerospace transparencies, and wearable transparencies. Further, the optical element used in the method of the present invention can be substantially transparent, or it may possess a uniform color (e.g., the optical element may be tinted), prior to deposition of the aforementioned colorant composition.

As aforementioned, prior to deposition of the light-absorbing composition to at least one surface of the optical element, the optical element has been treated on at least one surface with a photochromic composition comprising at least one first photochromic material. As used herein, the term "treated" means that a photochromic composition comprising at least one first photochromic material has been applied to the optical element by any known treatment techniques. For example, the photochromic composition could be applied to the surface of the optical element and allowed to absorb or imbibe into the surface region of the optical element (a technique known as imbibition). Alternatively, the photochromic composition can be applied in the form of a coating over the surface of the optical element. Such photochromic coatings are discussed herein below in more detail. The photochromic coatings can be applied, for example, by known coating techniques including, but not limited to, spin coating, sputter coating, dip coating, spray coating, and the like. The photochromic coating composition can be applied directly to the surface of the optical element, or applied over one or more coatings which previously have been applied to the optical element surface. Further, the photochromic coating composition can be applied to at least one surface of the optical element in a non-uniform linear pattern, such as gradient color pattern. Such a gradient pattern can be formed using known gradient coating techniques, such as dipping, or applied using an inkjet printing apparatus, such as that discussed below in regards to application of the light-absorbing composition.

Photochromic materials useful in the preparation of the photochromic compositions comprise at least one photochromic compound selected from the group consisting of pyrans, spiropyrans, oxazines, spiroxazines, fulgides, fulgimides, metallic dithizonates, diarylethenes, and mixtures thereof. Specific but non-limiting examples of suitable photochromic materials can include indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoroanthenoxazines, spiro(indoline)quinoxazines, fulgides, fulgimides, diarylethenes, diarylalkylethenes, and diarylalkenylethenes.

As used herein, the term "photochromic" and similar terms, such as "photochromic compound", includes thermally reversible photochromic compounds, and non-thermally reversible photochromic compounds, and mixtures thereof. The term "thermally reversible photochromic compounds/materials" as used herein means compounds/materials capable of converting from a first state (i.e., unactivated or clear state) to a second state (i.e., activated or colored state) in response to actinic radiation, and reverting back to the first state in response to thermal energy. The term "non-thermally reversible photochromic compounds/materials" as used herein means compounds/materials capable of converting from a first state (i.e., clear or unactivated state) to a second state (i.e., activated or colored state) in response to actinic radiation; and reverting back to the first state in response to actinic radiation of substantially the same wavelength(s) as the absorption(s) of the colored state.

In addition to the photochromic material, the photochromic composition can comprise one or more polymeric components. Examples of suitable polymeric components can include, but are not limited to, the following polymers or precursors thereof: polyvinyl alcohol, polyvinyl chloride, polyurethane, polyacrylate, and polycaprolactam. The photochromic composition can be a thermoplastic composition or a thermosetting composition. The photochromic composition can be a curable composition comprising a photochromic material, a curable resin composition, and, optionally, a solvent. Any of the curable resin compositions described herein below in regards to the light-absorbing composition can be used in formulating the photochromic composition.

The optical element can comprise any of the optical substrates well known in the art. The substrate may comprise an at least partially cured polymeric organic material chosen from thermosetting polymeric organic materials, thermoplastic polymeric organic materials, or a mixture of such polymeric organic materials. The polymeric organic material can be chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly (vinyl acetate), poly(vinyl alcohol), poly(vinyl chloride), poly(vinylidene chloride), thermoplastic polycarbonates, polyesters, polyurethanes, polythiourethanes, polysulfithiourethanes, poly(urea-urethane), poly(ethylene terephthalate), polystyrene, poly(alpha methylstyrene), copoly(styrene-methylmethacrylate), copoly(styrene-acrylonitrile), polyvinyl butyral, or polymers prepared from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers, or mixtures of such monomers.

Substrates suitable for use in the preparation of optical elements of the present invention typically demonstrate a refractive index of at least 1.55 and can include non-plastic substrates, such as glass. More often, substrates commonly used in optical applications are used, including polyol(allyl carbonate) monomers, e.g., allyl diglycol carbonates such as diethylene glycol bis(allyl carbonate), which monomer is sold under the registered trademark CR-39 by PPG Industries, Inc.; poly(urea)urethane polymers, which are prepared, for example, by the reaction of a polyurethane prepolymer and a diamine curing agent, a composition for one such polymer being sold under the registered trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the registered trademark LEXAN by Sabic Global Technologies; polyesters, such as the material sold under the registered trademark MYLAR by Dupont Teijin Films; poly(ethylene terephthalate); polyvinyl butyral; poly(methyl methacrylate), such as the material sold under the registered trademark PLEXIGLAS by Arkema France Corporation, and polymers prepared by reacting polyfunctional isocyanates with polythiols or polyepisulfide monomers, either homopolymerized or co- and/or terpolymerized with polythiols, polyisocyanates, polyisothiocyanates, and, optionally, ethylenically unsaturated monomers or halogenated aromatic-containing vinyl monomers. Also contemplated are copolymers of such monomers and blends of the described polymers and copolymers with other polymers, e.g., to form interpenetrating network products In a particular embodiment, the optical element is a lens. The lens can be an ophthalmic lens. As used herein, the term "optical" means pertaining to or associated with light and/or vision. As used herein, the term "ophthalmic" means pertaining to or associated with the eye and vision. Non-limiting examples of ophthalmic elements include corrective and non-corrective (piano) lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. As used herein, the term "display" means the visible or machine-readable representation of information in words, numbers, symbols, designs, or drawings. Non-limiting examples of display elements and devices include screens and monitors. As used herein, the term "window" means an aperture adapted to permit the transmission of radiation therethrough.

As mentioned above, in the method of the present invention, at least one light-absorbing composition is prepared. The light-absorbing composition comprises at least one ultraviolet light absorber, at least one second photochromic material which is the same or different than the first photochromic material, or mixtures thereof. The light-absorbing composition has an absorbance spectrum which substantially overlaps with the absorbance spectrum of the photochromic composition in the spectral region of photochromic activation. As used herein the term "spectral region of photochromic activation" means the wavelength range over which the photochromic components go from a first unactivated (colorless) state to a second activated (colored) state. The light-absorbing composition then is deposited over the surface of the optical element that has been treated with the photochromic composition in a controlled, predetermined pattern using an inkjet printing apparatus (as described in detail below) so as to provide a linearly gradient color pattern on the optical element upon exposure to actinic radiation.

Non-limiting examples of suitable ultraviolet light absorbers (hereinafter "UVA") include but are not limited to, those selected from the group consisting of hydroxyphenyl-benzotriazoles, hydroxybenzophenones, hydroxyphenyl-s-triazines, oxanalides, and mixtures thereof. Some specific non-limiting examples can include 2(2'-hydroxy-5'-methylphenyl) benzotriazole, 2-hydroxy-4-n-acetoxy benzophenone, 2(2'-hydroxy-5-5-octylphenyl) benzotriazole, 2(2'-hydroxy-3', 6'(1,1-dimethylbenzylphenyl) benzotriazole, 2(2'-hydroxy-3',5'-di-t-amylphenyl) benzotriazole, bis[2-hydroxy-5-methyl-3-(benzotriazole-2-yl)phenyl]-methane, 2-hydroxy-4-(2-hydroxy-3-methacryloxy)propoxy benzophenone, 2,2'-dihydroxy-4-methoxy benzophenone, 2,4-dihydroxy benzophenone, 2,2'-dihydroxy-4,4'-dimethoxy benzophenone, 2,2', 4,4'-tetrahydroxy benzophenone, 2',2',4-trihydroxybenzophenone, 2-hydroxy-4-acryloxyloxyethoxybenzophenone (polymer), 2-hydroxy-4-acryloyloxyethoxybenzophenone, 4-hydroxy-4-methoxybenzophenone, and 2-hydroxy-4-n-octoxybenzophenone. Another suitable UVA includes the compound described in U.S. Pat. No. 5,806,834 at column 5, line 50 to column 8, line 10, the cited portions of which are incorporated herein by reference. Likewise known salicylate compounds may be suitable. Mixtures of any of the foregoing UVAs can be used to prepare the light-absorbing composition. Suitable UVAs include those commercially available from BASF under the trade name TINUVIN.

Further, at least one second photochromic material, which may be the same or different from the first photochromic material discussed above, can comprise the light-absorbing composition. Any of the photochromic materials previously described can be employed as the second photochromic material in the light-absorbing composition. Likewise, a mixture of one or more UVA and one or more second photochromic materials can be used to prepare the light-absorbing composition, provided that the light-absorbing composition has an absorbance spectrum which substantially overlaps with the absorbance spectrum of the photochromic composition comprising the first photochromic material in the spectral region of photochromic activation of the photochromic composition in/on the optical element.

The light-absorbing composition generally further comprises a polymeric or resinous component. The resinous component can be thermoplastic or thermosetting. Often, the light-absorbing composition comprises a curable resin composition in combination with the UVA and/or the second photochromic material. The curable resin composition typically includes a first reactant (or component) having functional groups, e.g., hydroxyl functional polymer reactant; and a second reactant (or component) that is a crosslinking agent having functional groups that are reactive towards and that can form covalent bonds with the functional groups of the first reactant. The first and second reactants of the curable resin composition can each independently include one or more functional species, and are each present in amounts sufficient to provide cured coatings having a desirable combination of physical properties, e.g., smoothness, solvent resistance, and hardness.

Examples of curable resin compositions that can be used with the curable resin compositions include, but are not limited to, curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols, and amines); curable resin compositions that include active hydrogen functional polymer, such as hydroxy functional polymer and capped (or blocked) isocyanate functional crosslinking agent; and curable resin compositions that include active hydrogen functional polymer, such as hydroxy functional polymer, and aminoplast crosslinking agent.

With some aspects of the present invention, the light-absorbing composition comprises a UVA, and/or a second photochromic material and a curable resin composition which is a curable urethane (or polyurethane) resin composition. In addition to the photochromic material, such a curable urethane composition typically contains an active hydrogen functional polymer, such as a hydroxy functional polymer; and a capped (or blocked) isocyanate functional crosslinking agent. Hydroxy functional polymers that can be used in such compositions include, but are not limited to, art-recognized hydroxy functional vinyl polymers, hydroxy functional polyesters, hydroxy functional polyurethanes, and mixtures thereof.

Vinyl polymers having hydroxy functionality can be prepared by free radical polymerization methods that are known to those of ordinary skill in the art. With some aspects of the present invention, the hydroxy functional vinyl polymer is prepared from a majority of (meth)acrylate monomers and is referred to herein as a "hydroxy functional (meth) acrylic polymer".

Hydroxy functional polyesters useful in curable coating compositions that include capped isocyanate functional crosslinking agents can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium.

Hydroxy functional urethanes can be prepared by art-recognized methods. Typically, one or more difunctional isocyanates are reacted with one or more materials having two active hydrogen groups (e.g., diols or dithiols), such that the ratio of active hydrogen groups to isocyanate groups is greater than 1, as is known to the skilled artisan.

By "capped (or blocked) isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are typically capable of reacting and forming substantially permanent covalent bonds with the active hydrogen groups of the active hydrogen functional polymer (e.g., with the hydroxy groups of a hydroxy functional polymer).

It is desirable that the capping group of the capped isocyanate crosslinking agent not adversely affect the curable coating composition upon decapping from the isocyanate (i.e., when it becomes a free capping group). For example, it is desirable that the free capping group neither become trapped in the cured film as gas bubbles nor excessively plasticize the cured film. Capping groups useful in the present invention typically have the characteristics of being non-fugitive or capable of escaping substantially from the forming coating prior to its vitrification.

Classes of capping groups of the capped isocyanate crosslinking agent can be selected from, include, but are not limited to hydroxy functional compounds, e.g., linear or branched $C_2$-$C_8$ alcohols, ethylene glycol butyl ether, phenol and p-hydroxy methylbenzoate; 1H-azoles, e.g., 3,5-dimethyl pyrazole, 1H-1,2,4-triazole and 1H-2,5-dimethyl pyrazole; lactams, e.g., ε-caprolactam and 2-pyrolidinone; ketoximes, e.g., 2-propanone oxime and 2-butanone oxime. Other suitable capping groups include, but are not limited to, morpholine, 3-aminopropyl morpholine, and N-hydroxy phthalimide.

The isocyanate or mixture of isocyanates of the capped isocyanate crosslinking agent typically has two or more isocyanate groups (e.g., 3 or 4 isocyanate groups). Examples of suitable isocyanates that can be used to prepare the capped isocyanate crosslinking agent include, but are not limited to, monomeric diisocyanates, e.g., α,α'-xylylene diisocyanate, α,α,α',α'-tetramethylxylylene diisocyanate, and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet, or allophanate linkages, e.g., the trimer of IPDI.

The capped isocyanate crosslinking agent can also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (e.g., "TMP-3IPDI"). The three free isocyanate groups per TMP-3IPDI adduct are then capped with a capping group, e.g., a linear or branched $C_2$-$C_8$ alcohol.

To catalyze the reaction between the isocyanate groups of the capped polyisocyanate crosslinking agent and the hydroxy groups of the hydroxy functional polymer, one or more catalysts are typically present in the curable photochromic coating composition in amounts of from, for example, 0.1 to 5 percent by weight, based on total resin solids of the composition. Classes of useful catalysts include, but are not limited to, urethanization catalysts such as, organic tin compounds, e.g., tin(II) octanoate and dibutyltin(IV) dilaurate, as well as bismuth compounds, zinc compounds and salts thereof, zirconium compounds and salts thereof, carboxylates, and tertiary amines, e.g., diazabicyclo[2.2.2]octane.

It should be understood that any of the photochromic coatings known in the art can be used as the colorant composition in the method of the present invention. For example, suitable photochromic coatings can include those described in U.S. Pat. No. 7,189,456 at column 20 line 49 to column 24 line 6, the recited portions of which are incorporated by reference herein.

The light-absorbing compositions useful in the method of the present invention optionally further include a solvent. Examples of suitable solvents include, but art not limited to, acetates, alcohols, ketones, glycols, ethers, aliphatics, cycloaliphatics, and aromatics. Examples of acetates include, but are not limited to, ethyl acetate, butyl acetate, and glycol acetate. Examples of ketones include, but are not limited to, methyl ethyl ketone and methyl-N-amyl ketone. Examples of aromatics include, but are not limited to, toluene, naphthalene, and xylene. In one aspect of the present invention, one or more solvents can be added to each of the first reactant and the second reactant. Suitable solvent blends can include, for example, one or more acetates, propanol and its derivatives, one or more ketones, one or more alcohols, and/or one or more aromatics.

The light-absorbing compositions optionally contain additives, such as rheology additives for flow and wetting, e.g., poly(2-ethylhexyl)acrylate, or adjuvant resin to modify and optimize coating properties. The light-absorbing compositions which contain the at least one second photochromic material also may include antioxidants and hindered amine light stabilizers (HALS). Examples of useful antioxidants and HALS include those available commercially from BASF under the trademarks IRGANOX and TINUVIN.

In one embodiment of the present invention, two or more light-absorbing compositions are deposited over the surface of the optical element which has been treated with the photochromic composition, and each of the light-absorbing compositions can have the same or different absorbance spectra relative to one another. Further, each of the light-absorbing compositions can have different absorbance spectra relative to one another, and each of the light-absorbing compositions overlap with the absorbance spectrum of the photochromic composition in different spectral regions. Also in the method of the present invention, the at least one ultraviolet light absorber which is present in each of the two or more light-absorbing compositions is the same or different ultraviolet light absorber, and the ultraviolet light absorber is present in each of the respective light-absorbing compositions at a different concentration.

Likewise, in the method of the present invention, the at least one second photochromic material which is present in each of the two or more light-absorbing compositions is the same or different photochromic material, and the second photochromic material is present in each respective light-absorbing composition at a different concentration. In a further embodiment, the at least one second photochromic material which is present in each of the two or more light-absorbing compositions is the same or different photochromic material, and the second photochromic material is present in each respective light-absorbing composition at a different concentration.

In one aspect of the present invention, the photochromic composition with which the optical element has been treated has an unactivated (i.e., the optical element has not been exposed to actinic radiation and is in the first or colorless state) absorbance spectrum in the wavelength region of from 300 nanometers to 450 nanometers, and the light-absorbing composition has an absorbance spectrum in the wavelength region of from 300 nanometers to 440 nanometers.

As previously mentioned, in the method of the present invention, the light-absorbing composition is deposited on at least one surface of the optical element (which had previously been treated with a photochromic composition) in a controlled predetermined pattern using an inkjet printing apparatus so as to provide a linearly gradient color pattern on the optical element upon exposure of the optical element to actinic radiation. The inkjet printing apparatus applies a light-absorbing composition in the form of extremely fine droplets on the surface of the optical element. A discharge apparatus associated with the printing apparatus, such as one or more print heads, has one or more nozzles associated therewith. Each of the nozzles is configured to controllably discharge a single droplet of the composition, either continuously or on-demand. In the on-demand system, the discharge of droplets is controlled by a controller having pre-determined droplet discharge profile. For example, the controller may control the size of the drop (volume of light-absorbing composition) and the speed at which the drop is formed and delivered. In some aspects of the present invention, the one or more print heads may be provided with one or more piezoelectric elements that provide a mechanism for forming and discharging the droplets from the one or more print heads. A voltage applied to the one or more piezoelectric elements, such as a control voltage determined by the controller, changes the shape of the one or more piezoelectric elements, thereby generating a pressure pulse in the composition, which forces a droplet of the composition from the nozzle. The controller directs one or more print heads to generate droplets on demand. In this manner, the timing, position, and volume of composition delivered per unit of area of the printing surface can be controlled. In other aspects, a thermal ink jet apparatus can be employed. That is, the one or more print heads may have at least one chamber including a heater. A droplet is ejected from the chamber when a pulse of voltage is passed across the heater, such as a control voltage determined by the controller. Such a voltage differential causes a rapid vaporization of the composition in the chamber and forms a bubble. Formation of the bubble causes a pressure differential within the chamber, thereby propelling a droplet of the composition onto the surface of the optical element. The controller directs one or more print heads to generate droplets on demand. In this manner, the timing, position, and volume of material delivered per unit of area of the printing surface can be controlled.

Each droplet discharged from the nozzle of the print head is deposited on the surface of the optical element in the form of a single dot. Thus, assembly of deposited droplets creates an array that enables a pattern to be formed. In this manner, all or portions of the printing surface may be coated. When one or more portions of the optical element surface are printed, a controlled, predetermined linearly gradient pattern may be formed on the surface.

Each print head is in fluid communication with a storage reservoir. When the printing apparatus has more than one print head, individual storage reservoirs may be provided for each print head. Each storage reservoir is configured to store a light-absorbing composition to be delivered to the one or more print heads. In this manner, it is possible to print a plurality of different compositions at the same time by using a plurality of print heads to generate various gradient color patterns. Thus, the linearly gradient pattern may be formed on the surface of the optical element from the deposition of two or more light-absorbing compositions, or the gradient pattern may be formed from a single light-absorbing composition applied in one or more successive layers. Various additional devices, such as heaters, mixers, or the like, may be associated with each storage reservoir for preparing the composition prior to delivery to the one or more print heads. In some aspects of the invention, viscosity of the light-absorbing composition may be controlled, such as by increasing or reducing the viscosity of the composition, prior to loading the composition into the storage reservoir or prior to delivering the composition to the one or more print heads.

In another aspect, heating of the coating material within the print head manifold or reservoir also may be used to control coating viscosity prior to delivering the coating material to the substrate.

In a particular embodiment of the invention, the inkjet apparatus is comprised of multiple print heads, where each print head is provided with a different light-absorbing composition, wherein each light-absorbing composition is deposited on the surface of the optical element in a controlled predetermined pattern so as to provide a linearly gradient color pattern which varies in hue and/or color density from one area of the optical element to another area of the optical element upon exposure of the optical element to actinic radiation.

In another aspect of the invention, the inkjet apparatus is comprised of multiple print heads where one or more print head is provided with a composition which is free of UVA and free of any second photochromic material, while each of the remaining print heads is provided with the same or different light-absorbing composition. Each composition is deposited on the surface of the optical element in a predetermined pattern so as to provide a linearly gradient color pattern which varies in hue and/or color density from one area of the optical element to another area of the optical element upon exposure of the optical element to actinic radiation.

A plurality of print heads may be arranged in an array. The plurality of print heads may be arranged parallel to one another in a direction that is angled relative to a direction in which the optical element is moved relative to the print heads. Offsetting the print heads at an angle relative to the direction in which the optical element is moved relative to the print heads allows a complete coverage of optical elements of various shapes and sizes, for example, lenses having a convex, concave, or segmented surface. In other aspects, the print heads may be arranged linearly next to one other in a direction substantially parallel or perpendicular to the direction in which the optical element is moved relative to the print heads.

During the printing process, the light-absorbing composition may be applied on the surface of the optical element in a single pass in which the optical element is held stationary and the one or more print heads are moved, or in which the optical element is moved and the one or more print heads are held stationary, or in which both the optical element and the one or more print heads are moved. The single pass may be performed using a single print head or multiple print heads. In some aspects of the present invention, the light-absorbing composition may be applied on the optical element in two or more passes in which the optical element is held stationary and the one or more print heads are moved, or in which the optical element is moved and the one or more print heads are held stationary, or in which both the optical element and the one or more print heads are moved. Two or more passes may be performed using a single print head or multiple print heads.

The printing apparatus may have a controller for controlling the operation of the printing apparatus. The controller may be configured for controlling the printing operations of the one or more print heads and/or movement operations of the optical element and/or the one or more print heads. In addition, the controller may be configured to control the filling and delivery operations of the light-absorbing composition in the one or more storage reservoirs. For example, the controller may include a variety of discrete computer-readable media components for controlling the printing and/or movement operations. For example, this computer-readable media may include any media that can be accessed by the controller, such as volatile media, non-volatile media, removable media, non-removable media, transitory media, non-transitory media, etc. As a further example, this computer-readable media may include computer storage media, such as media implemented in any method or technology for storage of information, such as computer-readable instructions, data structures, program modules, or other data; random access memory (RAM), read-only memory (ROM), electrically erasable programmable read-only memory (EEPROM), flash memory, or other memory technology; CD-ROM, digital versatile disks (DVDs), or other optical disk storage; magnetic cassettes, magnetic tape, magnetic disk storage, or other magnetic storage devices; or any other medium which can be used to store the desired information and which can be accessed by the controller. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

A user may enter commands, information, and data, such as information relating to an art form file of a desired printed layer, into the controller through certain attachable or operable input devices via a user input interface. Of course, a variety of such input devices may be utilized, e.g., a microphone, a trackball, a joystick, a touchpad, a touch-screen, a scanner, etc., including any arrangement that facilitates the input of data, and information to the controller from an outside source. Still further, data and information can be presented or provided to a user in an intelligible form or format through certain output devices, such as a monitor (to visually display this information and data in electronic form), a printer (to physically display this information and data in print form), a speaker (to audibly present this information and data in audible form), etc. All of these devices are in communication with the controller, e.g., through an output interface. It is envisioned that any such peripheral output devices be used to provide information and data to the user.

In the method for producing the optical element in accordance with the present invention, the light-absorbing composition (or composition free of UVA and/or photochromic material) may be leveled to assure a uniform thickness of the composition which will be or has been deposited on the surface of the optical element. Leveling may be performed concomitant with the depositing step, or after the depositing step is completed. A leveling device may be used to accomplish this. Furthermore, leveling may be prior, concomitant, or after any additional post-processing steps after the depositing step but before the drying step. In some aspects, the leveling step may include vibrating the optical element. Vibration of the optical element may be performed linearly, for example in the form of reciprocal movement along one axis. In other aspects, vibration of the optical element may be performed linearly along two axes, such as vibrating the optical element linearly in one plane. In some aspects, the leveling step may include vibrating the optical element at a frequency of 10 Hz to 110 Hz. Further, the leveling step may include vibrating the optical element for 3 seconds to 30 seconds.

Once deposited in a controlled, predetermined pattern so as to form a linearly gradient color pattern on the optical element upon exposure to actinic radiation, the light-absorbing composition (or the composition free of UVA and/or photochromic material) is dried. As used herein, the terms "dried" or "drying" mean that the composition is exposed to ambient conditions or elevated temperatures in order to evaporate any solvents present; and/or that the colorant composition is at least partially cured to promote at least partial reaction of any reactive components present in the colorant composition (e.g., in the case of a curable colorant composition). Both radiation curing and thermal curing are contemplated.

In a particular embodiment of the present invention, the optical element is a lens, such as an ophthalmic lens, and the linearly gradient color pattern varies in hue and/or color density from the bottom of the lens to the top of the lens upon exposure of the lens to actinic radiation. Further, upon exposure of the lens to actinic radiation, the gradient color pattern generally has a higher percent light transmittance at the bottom of the lens than at the top of the lens.

The optical elements prepared by the method of the present invention optionally can include one or more layers in addition to the light-absorbing composition deposited according to the method of the invention and in addition to the photochromic composition layer(s) which previously had been used to treat the optical element prior to deposition of the light-absorbing composition. Examples of such additional layers include, but are not limited to, primer coatings and films (typically applied to the optical element surface(s) prior to deposition of the photochromic composition); protective coatings and films (applied before or after deposition of the light-absorbing composition on to the optical element surface, including transitional coatings and films and abrasion-resistant coatings and films; anti-reflective coatings and films; polarizing coatings and films; and combinations thereof. As used herein, the term "protective coating or film" refers to coatings or films that can prevent wear or abrasion, provide a transition in properties from one coating or film to another, protect against the effects of polymerization reaction chemicals, and/or protect against deterioration due to environmental conditions, such as moisture, heat, ultraviolet light, oxygen, etc.

As used herein, the term "transitional coating and film" means a coating or film that aids in creating a gradient in properties or compatibility between two coatings or films, or a coating and a film. For example, although not limiting herein, a transitional coating can aid in creating a gradual change in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein, the term "abrasion-resistant coating and film" refers to a protective polymeric material that demonstrates a resistance to abrasion that is greater than a standard reference material, e.g., a polymer made of CR-39® monomer available from PPG Industries, Inc., as tested in a method comparable to ASTM F-735 Standard Test Method for Abrasion Resistance of Transparent Plastics and Coatings Using the Oscillating Sand Method. Non-limiting examples of abrasion-resistant coatings can include, but are not limited to, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT® and HI-GARD® coatings, available from SDC Coatings, Inc. and PPG Industries, Inc., respectively.

The abrasion-resistant coating or film (often referred to as a hard coat layer) can, with some aspects, be selected from art-recognized hard coat materials, such as organosilane abrasion-resistant coatings. Organosilane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organosilane hard coatings and which disclosures are incorporated herein by reference. Reference is also made to U.S. Pat. Nos. 4,731,264, 5,134, 191, 5,231,156, and International Patent Publication No. WO 94/20581 for disclosures of organosilane hard coatings, which disclosures are also incorporated herein by reference. The hard coat layer can be applied by art-recognized coating methods, such as, but not limited to, roll coating, spray coating, curtain coating, and spin coating.

Non-limiting examples of suitable antireflective coatings and films include a monolayer, multilayer, or film of metal oxides, metal fluorides, or other such materials, which can be deposited onto the articles disclosed herein (or onto films that are applied to the articles), for example, through vacuum deposition, sputtering, etc. Non-limiting examples of suitable conventional photochromic coatings and films include, but are not limited to, coatings and films comprising conventional photochromic materials.

Although the present invention has been described with reference to specific details of certain embodiments thereof, it is not intended that such details should be regarded as limitations upon the scope of the invention except insofar as they are included in the accompanying claims.

The invention claimed is:

1. A method for preparing an optical element which colors in a non-uniform linear pattern upon exposure to actinic radiation, the method comprising:
   (i) providing an optical element;
   (ii) applying a curable photochromic coating composition on at least one surface of the optical element to form a coating thereover, the photochromic coating composition comprising at least one first photochromic material comprising an indeno-fused naphthopyran, the photochromic coating composition having an absorbance spectrum in the wavelength region of photochromic activation;

(iii) preparing at least one curable light-absorbing composition comprising at least one ultraviolet light absorber, at least one second photochromic material which is the same or different than the first photochromic material, or mixtures thereof, and a curable resin composition comprising an active hydrogen functional polymer and a capped isocyanate functional crosslinking agent, the at least one curable light-absorbing composition having an absorbance spectrum which substantially overlaps with the absorbance spectrum of the photochromic coating composition in the region of photochromic activation;

(iv) depositing the at least one curable light-absorbing composition over the surface of the optical element that has been treated with the photochromic composition in a controlled, predetermined pattern using a piezo-electric inkjet printing apparatus so as to provide a linearly gradient color pattern on the optical element upon exposure to actinic radiation; and (v) drying at least the at least one curable light-absorbing composition.

2. The method of claim 1, wherein two or more light-absorbing compositions are deposited over the surface of the optical element which has been treated with the photochromic composition, and wherein each of the light-absorbing compositions have the same or different absorbance spectra relative to one another.

3. The method of claim 2, wherein each of the light-absorbing compositions have different absorbance spectra relative to one another, and wherein each of the light-absorbing compositions overlap with the absorbance spectrum of the photochromic composition in different spectral regions.

4. The method of claim 2, wherein the at least one ultraviolet light absorber which is present in each of the two or more light-absorbing compositions is the same or different ultraviolet light absorber, and wherein the ultraviolet light absorber is present in each respective light-absorbing composition at a different concentration.

5. The method of claim 4, wherein the at least one second photochromic material which is present in each of the two or more light-absorbing compositions is the same or different photochromic material, and wherein the second photochromic material is present in each respective light-absorbing composition at a different concentration.

6. The method of claim 2, wherein the at least one second photochromic material which is present in each of the two or more light-absorbing compositions is the same or different photochromic material, and wherein the second photochromic material is present in each respective light-absorbing composition at a different concentration.

7. The method of claim 1, wherein the light-absorbing composition comprises a mixture of ultraviolet light absorbers and/or at least one second photochromic material.

8. The method of claim 1, wherein the inkjet apparatus is comprised of multiple print heads, where each print head may be provided with a different light-absorbing composition, wherein each light-absorbing composition is deposited on the surface of the optical element in a controlled predetermined pattern so as to provide a linearly gradient color pattern which varies in hue and/or color density from one area of the optical element to another area of the optical element upon exposure of the optical element to actinic radiation.

9. The method of claim 1, wherein the optical element is selected from the group consisting of lenses, windows, display elements, goggles, visors, face shields, automotive transparencies, aerospace transparencies, and wearable displays.

10. The method of claim 9, wherein the optical element is an ophthalmic lens.

11. The method of claim 10, wherein the optical element is an ophthalmic lens and, upon exposure to actinic radiation, the gradient color pattern has a higher percent light transmittance at the bottom of the lens than at the top of the lens.

12. The method of claim 11, wherein the optical element is a photochromic ophthalmic lens and, upon exposure of the lens to actinic radiation, the gradient color pattern exhibits a higher percent light transmittance at the bottom of the lens than at the top of the lens.

13. The method of claim 1, wherein the light-absorbing composition comprises an ultraviolet light absorber selected from the group consisting of hydroxyphenylbenzotriazoles, hydroxybenzophenones, hydroxyphenyl-s-triazines, oxanalides, and mixtures thereof.

14. The method of claim 1, wherein the photochromic composition with which the optical element has been treated has an unactivated absorbance spectrum in the wavelength region of from 300 nanometers to 450 nanometers, and the light-absorbing composition has an absorbance spectrum in the wavelength region of from 300 nanometers to 440 nanometers.

15. The method of claim 1, further comprising leveling the light-absorbing composition during the depositing step (iv) or immediately thereafter, but prior to the drying step (v).

16. The method of claim 15, wherein the leveling comprises vibrating the optical element.

17. The method of claim 16, wherein the leveling comprises vibrating the optical element linearly along one axis and/or linearly along two axes.

18. The method of claim 16, wherein the leveling comprises vibrating the optical element linearly in one plane.

19. An optical element prepared by the method of claim 1.

20. A method for preparing an optical element which colors in a non-uniform linear pattern upon exposure to actinic radiation, the method comprising:

(i) providing an optical element;
(ii) applying a curable photochromic coating composition on at least one surface of the optical element to form a coating thereover, the photochromic coating composition comprising at least one first photochromic material comprising an indeno-fused naphthopyran, the photochromic coating composition having an absorbance spectrum in the wavelength region of photochromic activation;
(iii) preparing two or more light-absorbing compositions, wherein each light-absorbing composition comprises a different ultraviolet light absorber, at least one second photochromic material which is the same or different than the first photochromic material, or mixtures thereof, and a curable resin composition comprising an active hydrogen functional polymer and a capped isocyanate functional crosslinking agent,
wherein each light-absorbing composition has a different absorbance spectra relative to one another, and wherein each of the light-absorbing compositions overlaps with the absorbance spectrum of the photochromic composition on the surface of the optical element in different spectral regions, (iv) depositing the two or more light-absorbing compositions over the photochromic coating composition in a controlled, predetermined pattern using a piezo-electric inkjet printing apparatus so as to provide a linearly gradient color pattern on the optical element upon exposure to actinic radiation; and (v) drying the two or more light-absorbing compositions.

* * * * *